UNITED STATES PATENT OFFICE.

OSCAR LOEW AND JULIUS E. DOTCH, OF NEW YORK, N. Y.

IMPROVEMENT IN PROCESSES FOR DEODORIZING OILS AND FATS.

Specification forming part of Letters Patent No. 133,322, dated November 26, 1872; antedated November 21, 1872.

*To all whom it may concern:*

Be it known that we, OSCAR LOEW and JULIUS EDMUND DOTCH, both of the city of New York, county and State of New York, have invented a new process to deodorize and to extract the offensive principle and rancid constituents from different fats, such as cocoa-nut oil, rancid tallow, spoiled butter, &c., and transforming the same into valuable marketable products, of which the following is a specification:

The nature of our invention consists in the following treatment: Cocoa-nut oil consists principally of laurine and myristine, and of a small percentage of butyrate, capronate, and caprylate of glycerine. The latter three constituents are the principal cause of the disagreeable smell of the oil and of the soap made from it.

In order to separate these latter three substances from the oil, and to obtain the pure laurine and myristine, we proceed as follows: The cocoa-nut oil is melted at a temperature of 95° to 100°, and an equal volume of alcohol added, when the whole is continually and thoroughly agitated at the above temperature. The alcohol is thrown off carefully from the oil, which settles soon at the bottom. The same process is repeated twice over with fresh alcohol. The alcohol thus dissolves the offensive principle, consisting of the above-named substances, while pure laurine and myristine remain behind, which represent the purified and deodorized cocoa-nut oil.

There will be no loss in alcohol whatsoever if the alcohol is well separated from the oil and redistilled in a suitable apparatus, whereby the alcohol is obtained of the same strength and purity as when applied before. Thus the same alcohol may be reapplied over and over again, so that the cost of the process is a very trifling one.

The alcohol, after distillation, leaves behind in the still the butyrate, capronate, and caprylate of glycerine, forming about three to four per cent. of the original oil. These substances may be utilized with much profit by converting them into ethers and so-called flavoring essences, which is done by saponifying the oily residuum, separating the fatty acids by sulphuric or hydrochloric acid, and treating them with alcohol saturated with hydrochloric-acid gas, and subjecting it afterward to distillation. Essences of the finest flavor, such as pine-apple, bananas, œnanthic ether, &c., are obtained. These oils have great commercial value for liquors, candies, ice-creams, &c. Rancid tallow, when treated in the same manner, becomes white and sweet. Spoiled butter reacquires its original mild taste and flavor.

The same method is applicable to the purification of palm-oil, cod-liver oil, and all fish-oils and other fatty substances.

What we claim is—

1. The process, herein described, of treating all fatty matters, as above enumerated, for the purpose of purification and deodorization.

2. The method of separating laurine and myristine, forming the principal constituents of cocoa-nut oil, from the butyrate, capronate, and caprylate of glycerine, which represent the impurities and the offensive principle of the oil, and converting these latter three substances into valuable ethereal flavoring essences.

OSCAR LOEW.
JULIUS EDMUND DOTCH.

Witnesses:
HENRY T. BROWN,
FRED. HAYNES.